US009229549B1

(12) United States Patent
Lee

(10) Patent No.: US 9,229,549 B1
(45) Date of Patent: Jan. 5, 2016

(54) RANDOM SCANNING TECHNIQUE FOR SECURE TRANSACTIONS ENTERED WITH CAPACITIVE SENSOR INPUT DEVICE

(75) Inventor: Mark R. Lee, Edmonds, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1836 days.

(21) Appl. No.: 12/156,384

(22) Filed: May 29, 2008

Related U.S. Application Data

(60) Provisional application No. 60/932,230, filed on May 29, 2007.

(51) Int. Cl.
*G06F 3/041* (2006.01)

(52) U.S. Cl.
CPC ...................... *G06F 3/041* (2013.01)

(58) Field of Classification Search
CPC ....... G06F 3/041; G06F 3/0412; G06F 3/044; G06F 3/047
USPC .................................. 345/173–179
See application file for complete search history.

(56) References Cited

U.S. PATENT DOCUMENTS

| 8,659,568 | B2* | 2/2014 | Krah et al. ................. 178/18.01 |
| 8,922,519 | B2* | 12/2014 | Krah et al. ................. 178/18.06 |
| 2002/0075241 | A1* | 6/2002 | Junghans ....................... 345/173 |
| 2006/0221061 | A1* | 10/2006 | Fry ................................ 345/173 |
| 2006/0255128 | A1* | 11/2006 | Johnson et al. ............... 235/380 |
| 2007/0195064 | A1* | 8/2007 | Morioka ........................ 345/173 |
| 2008/0062148 | A1* | 3/2008 | Hotelling et al. ............. 345/174 |
| 2008/0158179 | A1* | 7/2008 | Wilson .......................... 345/173 |
| 2008/0158180 | A1* | 7/2008 | Krah et al. ..................... 345/173 |
| 2008/0162996 | A1* | 7/2008 | Krah et al. ........................ 714/27 |
| 2009/0128512 | A1* | 5/2009 | Segev et al. .................. 345/174 |
| 2011/0031042 | A1* | 2/2011 | Wu et al. .................... 178/18.06 |
| 2011/0069028 | A1* | 3/2011 | Li et al. ........................ 345/173 |

OTHER PUBLICATIONS

Signature Capture Solutions for the Retail Market, Ingenico 6770, Groupe Ingenico, France, http://www.ingenico.com/INGENICO_GALLERY_CONTENT /Documents/corporate/products/PINPad/i6770/datasheet-i6770-uk.pdf, accessed May 29, 2008, ( 2 pages).
EMV Card Payment Solutions for the Unattended Payment Industry, Ingenico 9400, Groupe Ingenico, France, http://www.ingenico.com/INGENICO GALLERY_CONTENT/Documents /corporate/products/unattended/datasheet-i9400-uk.pdf, accessed May 29, 2008, ( 2 pages).

\* cited by examiner

*Primary Examiner* — Alexander Eisen
*Assistant Examiner* — Nelson Lam

(57) ABSTRACT

A random scanning technique for secure transactions entered with a capacitive sensor input device is described.

20 Claims, 7 Drawing Sheets

RANDOM SCANNING TECHNIQUE FOR SECURE TRANSACTIONS ENTERED WITH CAPACITIVE SENSOR INPUT DEVICE

This application claims the benefit of U.S. Provisional Application No. 60/932,230, filed May 29, 2007, the entire contents of which are hereby incorporated by reference herein.

TECHNICAL FIELD

The present invention relates generally to input scanning techniques and, more particularly, to a random scanning technique for secure transactions entered with a capacitive sensor input device.

BACKGROUND

Point-of-sale (POS) and automated teller machine (ATM) terminals are often used at outdoor events and venues where the no-moving-parts feature of capacitive sensing is a value added feature. In conventional terminals with touch-sensitive keys, the keys are scanned in a fixed sequence. An identity thief may attempt to intercept a user's personal identification number (PIN) or password using a snooping device. Scanning keys in sequence makes it easy to correlate capacitive changes due to fingers to the physical location of the touch location.

Such conventional terminals may not include anti-snooping security features. An identity thief could log the waveforms generated by sensor array using an e-field sensor, a capacitive probe, soldering wires directly to sensor elements, or with a transparent Indium Tin Oxide (ITO) overlay. By close inspection of the scanning signature, the location of a finger can be deduced by correlating the changes in the waveform to the known key scanning sequence. It may also be possible to capture a scanning signature using a sensitive RF receiver, with the same result in loss of security. Additionally, a snooping device may scan individual sensor elements and, thus no correlation of scanning order would be required. Accordingly, in a POS application, anti-snooping features are desirable to prevent identity theft.

BRIEF DESCRIPTION OF THE DRAWINGS

The present invention is illustrated by way of example and not limitation in the figures of the accompanying drawings, in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A random scanning technique for secure transactions entered with a capacitive sensor input device is described. One embodiment of the present inventions pertains to key scanning algorithms for touch screen terminals in which touch sensitive keys are scanned in a random sequence to create secure transactions that are difficult for identity thieves to snoop for personal information (passwords, PIN's, etc). In conventional terminals with touch-sensitive keys, the keys are scanned in a fixed sequence. Scanning keys in a fixed sequence makes it easy to correlate capacitive changes due to fingers to the physical location of the touch location.

Figure 1:
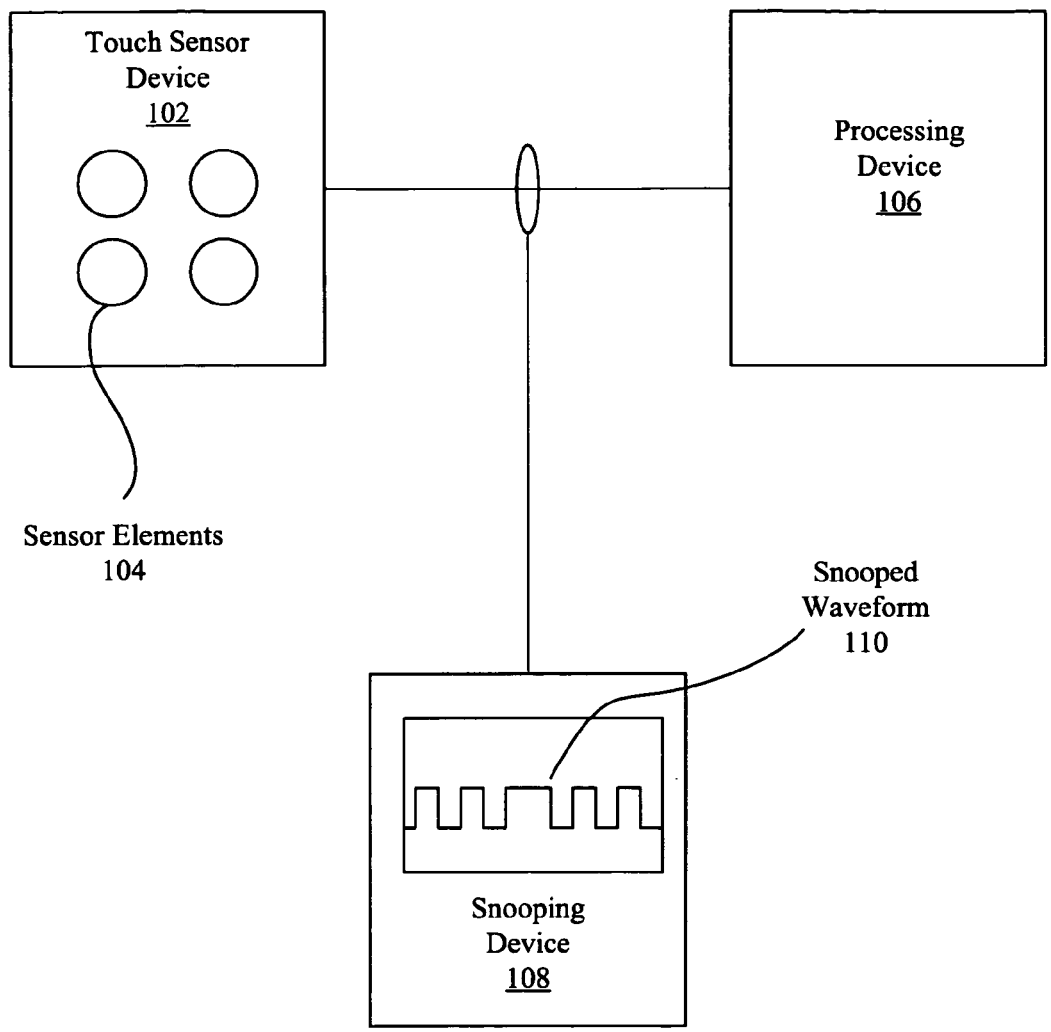
FIG. 1 illustrates an exemplary snooping device picking up scanning sequence at one location.

FIG. 1 illustrates a snooping device 108 monitoring a scanning sequence of touch sensor device 102 at one location. In this example, snooping device 108 obtains the waveform that represents all of the sensor elements 104 as scanned by the processing device 106. The waveform can be obtained by intercepting the scanning sequence waveforms via a capacitive probe placed next to a cable or by using a wireless probe with high gain. If the sequence of scanning sensor elements 104 is fixed, then the value of a touch on a touch-sensitive key can be determined by matching the timing of the snooped waveform 110 with the presence of a touch on a touch-sensitive key to the timing of a waveform without the presence of a touch on a touch-sensitive key.

Figure 2:
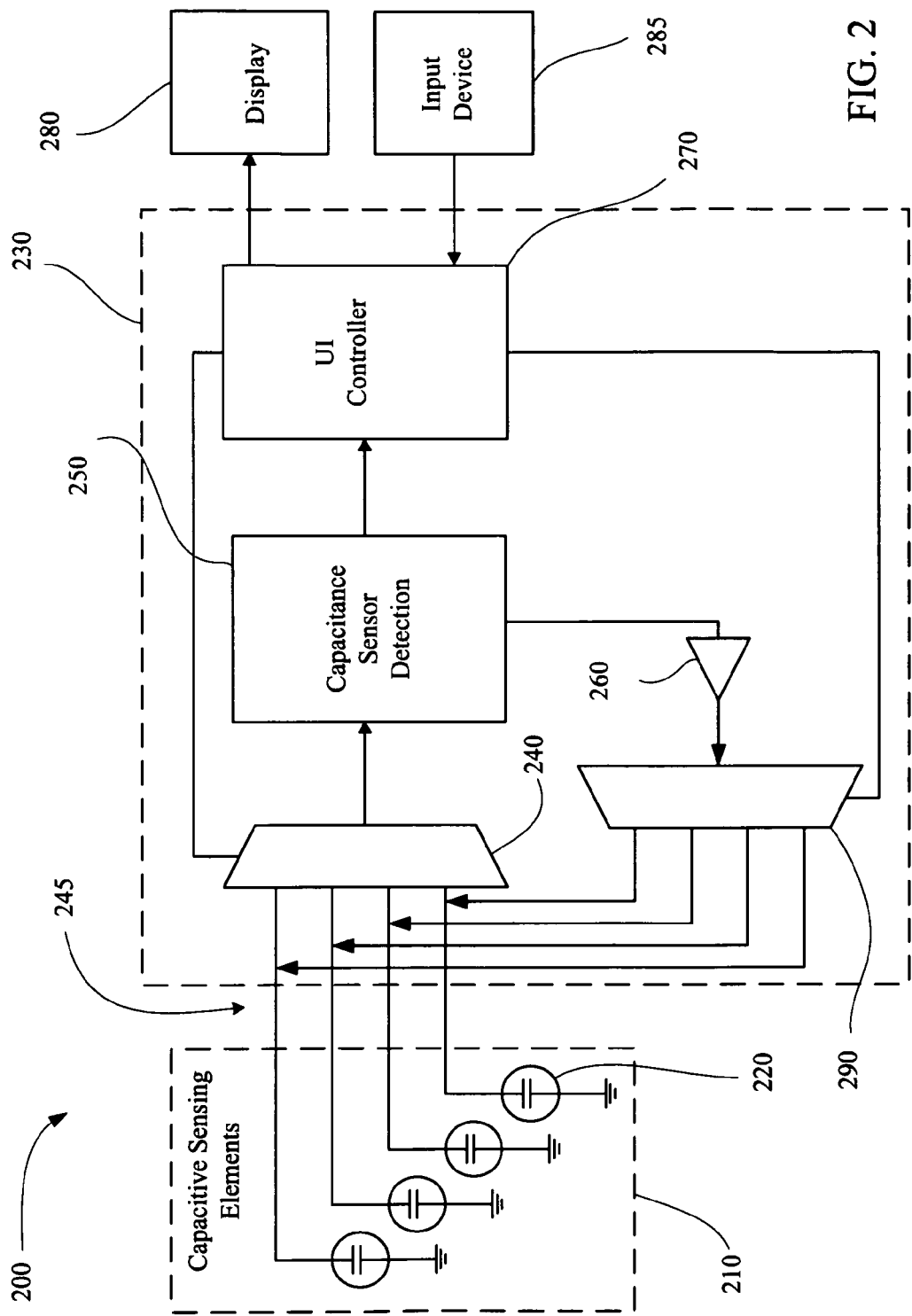
FIG. 2 illustrates an exemplary circuit for scanning capacitive sensors in a random order and mirroring a capacitive sensor waveform from one sensor element to another sensor element according to one embodiment of the present invention.

FIG. 2 illustrates an exemplary apparatus 200 for scanning capacitive sensors in a random order and mirroring a capacitive sensor waveform from one sensor element on another sensor element according to one embodiment of the present invention. Apparatus 200, as shown in FIG. 2, provides greater detail to touch sensor device 102 and processing device 106 of FIG. 1. Apparatus 200 is described in terms of modules, which may include physical, electrical, and software components.

In an embodiment, touch screen 210, having multiple capacitive sensing elements 220, is coupled with processing device 230. The processing device 230 is also coupled to a display 280. Processing device 230 may reside on a common carrier substrate such as, for example, an integrated circuit (IC) die substrate, a multi-chip module substrate, or the like. Alternatively, the components of the processing device 230 may be one or more separate integrated circuits and/or discrete components. In one exemplary embodiment, processing device 230 may be a Programmable System on a Chip (PSoC™) processing device, manufactured by Cypress Semiconductor Corporation, San Jose, Calif. Alternatively, processing device 230 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Touch screen 210 may be, for example, a touch panel having one or more touch-sensor buttons, a touchpad, a touch-sensor slider, a touch screen, etc. In one embodiment, touch screen 210 is a transparent overlay on display 280. Such displays can be attached to devices such as, for example, computers, network terminals, mobile handsets, kiosks, game consoles, and personal digital assistants (FDA's). In one embodiment, apparatus 200 is a POS terminal. In another embodiment, apparatus 200 may be other types of devices, for example, an ATM terminal.

In one embodiment, touch screen 210 operates by way of capacitance sensing, utilizing capacitive sensors 220. The capacitance detected at a capacitive sensor 220 changes as a function of the proximity of a conductive object to the sensor. The conductive object can be, for example, a conductive stylus or a user's finger. In one embodiment, touch screen 210 has a sensor array that may include one or more of the following: button(s), circular or linear slider(s), and touchpad. These touch-sensor input devices may include a one-dimensional sensor array, detecting movement in one axis, or multi-dimensional sensor arrays for detecting movement in multiple axes.

Reference is made to capacitive sensors throughout the description for ease in understanding embodiments of the present invention. It will be evident, however, to one skilled in the art that the present invention may be practiced according to different touch screen technologies. In one embodiment, the touch screen operates based upon one or more of the following touch screen technologies: optical imaging, resistive, surface acoustical wave, capacitive, infrared, dispersive signal, piezoelectric, and strain gauge technologies.

Apparatus 200 includes a selection module 240, a capacitive sensor detection module 250, and a user interface (UI) controller 270. The selection module 240 is coupled to the capacitive sensing elements 220 by a bus 245. In one embodiment, the selection module 240 is a multiplexer. Alternatively, other types of selection circuits may be used that can be configured to sequentially select one of the multiple sensor elements 220 to provide a charge current and to measure the resulting waveform. In one embodiment, the selection module 240 is configured to sequentially select the individual sensor elements 220. UI controller 270 is coupled with selection module 240 in order to select which capacitive sensing element 220 to connect with capacitive sensor detection module 250.

In another embodiment, the selection module 240 is configured to sequentially select sets of sensor elements, such as rows or columns. The individual sensor elements 220 of FIG. 2 represent an intersection of multiple sets of sensor elements in a sensor array that make up the touch screen 210. The location of a conductive object on the touch screen 210 sensor array is determined by detecting the presence of a conductive object on a sensor element 220, thus altering the capacitance of that circuit, and producing a signal representative of the location of that sensor element in relation to the sensor array. For example, a scan of a row and column of an array of sensor elements may result in a signal produced by a user touching a sensor element 220 that represents the intersection of that row and column.

In one embodiment, the selection module 240 is configured to provide charge current to the selected sensor elements 220 and couple the circuit with capacitive sensor detection module 250. The capacitive sensor detection module 250 is configured to receive a signal representative of the interaction (or lack thereof) with a touch screen 210. The signal is representative of the capacitance measured on an individual capacitive sensor element 220.

In one embodiment, capacitive sensor detection module 250 is a capacitance switch relaxation oscillator (CSR) module. In another embodiment, capacitive sensor detection module 250 measures capacitance via capacitance successive approximation (CSA). Alternatively, capacitance is measured in capacitive sensor detection module 250 using a capacitance sigma-delta (CSD) technique or by another method known in the art such as, for example, phase shift measurement, charging the sensor capacitor from constant current source, using a capacitive voltage divider circuit, or using a charge-accumulation circuit.

In one embodiment, the signal received by capacitance sensor detection module 250 from a sensor element 220 with no conductive object present has known characteristics that are stored by the UI controller 270. The UI controller 270 compares a signal received by capacitance sensor detection module 250 against the known characteristics, e.g., timing or amplitude, and determines whether a conductive object is present based on the comparison. In an alternate embodiment, the comparison is made by capacitance sensor detection module 250.

In one embodiment, the UI controller 270 includes a decision logic block. The operations of decision logic block may be implemented in firmware; alternatively, the decision logic block may be implemented in hardware or software. The decision logic block may be configured to receive the digital code or counts from the capacitance sensor detection module 250, and to determine the state of the touch screen 210, such as, e.g., whether a conductive object is detected on or in proximity to a sensing element 220. Additionally, the decision logic block controls the sequence of connections to capacitive sensing elements 220 via selection modules 240.

In one embodiment, the UI controller 270 is further coupled with an input device 285. In one embodiment, the input device 285 is a card reader that reads information from a card to authenticate the identity of a user. For example, in the case of an ATM, the card reader may have a magnetic stripe reader or a microchip reader that obtains information from a bank card. The combination of the information obtained from the card and input on the touch screen 210 can be used to grant access to a bank account. A similar process can be used with a bank card or credit card in a POS terminal transaction.

Figure 3:
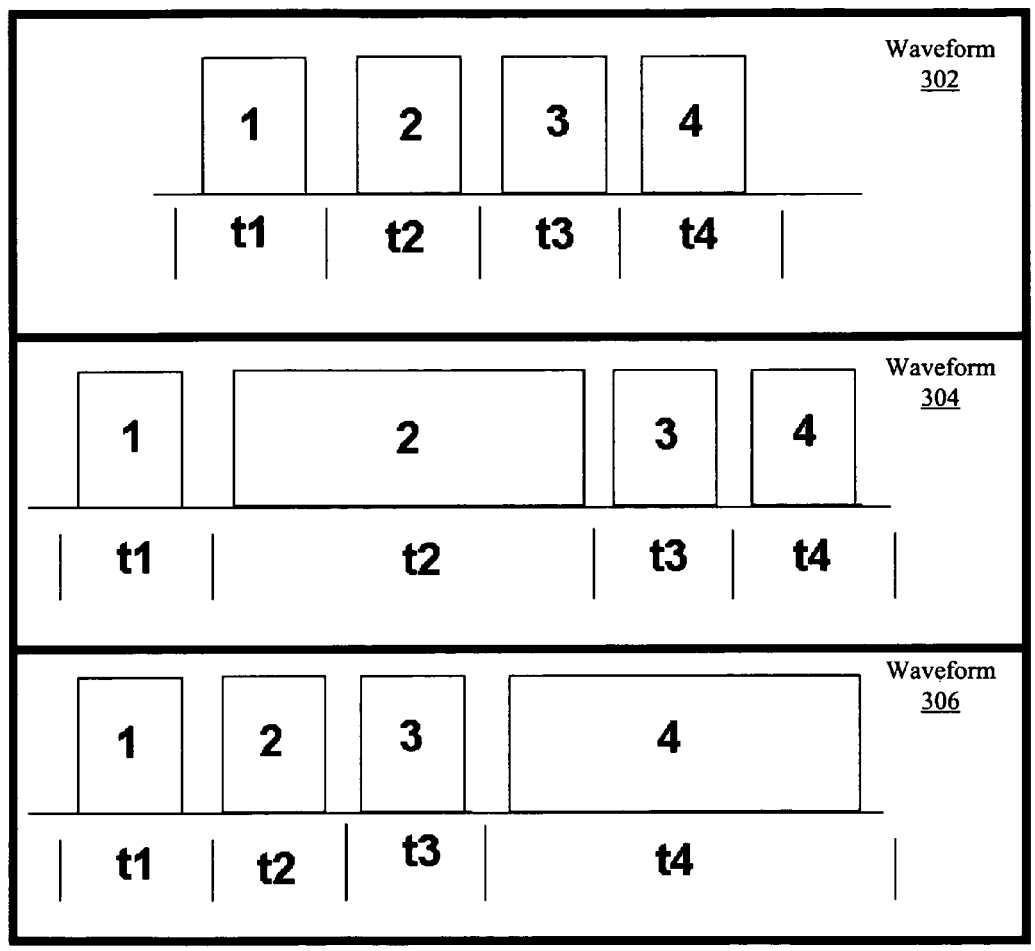
FIG. 3 illustrates an example timing of capacitive sensor waveforms monitored on the snooping device of FIG. 1 for a fixed scanning sequence.

FIG. 3 illustrates an example timing of capacitive sensor waveforms monitored on snooping device for fixed scanning sequence. In one embodiment, a scanning sequence is initiated by apparatus 200 awaiting user input, e.g., a pin associated with a card read by card reader 285. Waveform 302 represents a scan with no conductive object near a sensor element. As no conductive object is present to alter waveform 302, time units t1 through t4 are approximately the same length. Waveform 304 represents a scan with a conductive object near sensor element 2. Accordingly, the conductive object alters waveform 304 and t2 is much longer than previously observed. Waveform 306 represents a scan with a conductive object near sensor element 4. Accordingly, the conductive object alters waveform 306 and t4 is much longer than before. By observing the changes in the individual sections of the sequence timing and knowing that scanning is always done in the same sequence, the sensor(s) being pressed can be deduced.

FIG. 3 demonstrates that a predictable sequence of key scans can lead to the determination of the value of touch-sensitive keys and, thus, the input information they represent. A snooping device, as illustrated in FIG. 1, shows the repeated sequence of scanned keys, e.g., waveform 302. Once a conductive object alters the scanning waveform, the snooping device obtains a corresponding alteration in the frequency or magnitude of waveform, e.g., waveforms 304 and 306. Determining the value of the key at which the sequence starts (e.g., sensor element 1) would reveal the value of each key scan that follows if the scan follows an ordered sequence (e.g., sensor elements 1, then 2, then 3, and finally 4). Therefore, as shown in FIG. 3, an identity thief can use the snooped waveform to detect the actual touch-sensitive keys selected: 2 and 4.

In contrast, the sensor being depressed cannot be easily deduced by matching the timing of the snooped waveform to the timing without a conductive object present when the scanning of touch-sensitive keys is performed in a random pattern. Random scanning results in no correlation between the physical locations of a user's finger and the scan sequence.

Various techniques may be used for generating a random sequence to implement embodiments of the present invention. In one embodiment, a random number generator (RNG) is limited to the number of touch-sensitive keys and produces a random sequence of numbers associated with each key. The touch-sensitive keys are then scanned in the order according to the output of the RNG. In one embodiment, the processing device generates the random scanning sequence in UI Controller 270, as illustrated in FIG. 2.

Figure 4:
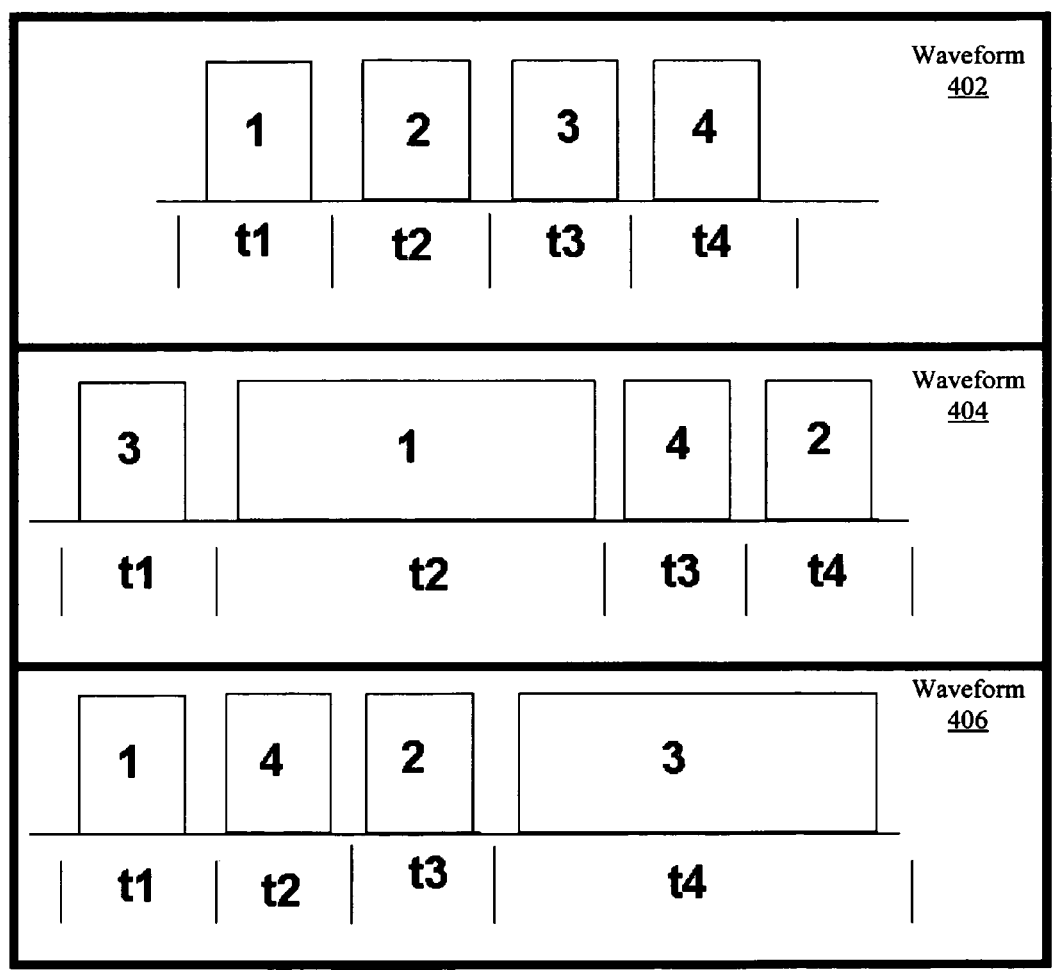
FIG. 4 illustrates an example timing of capacitive sensor waveforms monitored on the snooping device of FIG. 1 for a randomized scanning sequence according to one embodiment of the present invention.

FIG. 4 is an example timing of a capacitive sensor waveform monitored on snooping device for randomized scanning sequence according to one embodiment of the present invention. In FIG. 4, the waveform 402 represents a scan with no conductive object near a sensor element resulting in t1 through t4 to be about the same length.

Waveform 404 represents a scan, in random order, with a conductive object near sensor element 1. The random sequence order scans sensor elements 3, then 1, then 4, and finally 2. Accordingly, the conductive object alters waveform 404 when sensor element 1 is scanned and t2 is much longer than previously observed. A snooped waveform, based on the assumption that the keys were scanned in order (e.g., 1-2-3-4), leads to a determination that a conductive object was present at sensor element 2.

Waveform 406 represents a scan with a conductive object near sensor element 3. The random sequence order scans sensor elements 1, then 4, then 2, and finally 3. Accordingly, the conductive object alters waveform 406 when sensor element 3 is scanned and t4 is much longer than before. A snooped waveform, based on the assumption that the keys were scanned in order, leads to a determination that a conductive object was present at sensor element 4.

Therefore, the sequence of changes in the timing of the waveform does not correlate to which sensor is pressed. A snooping device, as illustrated in FIG. 1, shows a sequence of scanned keys. Nevertheless, without knowledge of the order of the sequence of scans, the snooped waveform does not reveal the actual keys selected. While the processing device knows which sensor is currently being scanned, an observer on a snooping device cannot determine the values of the sensors by comparing waveforms 404 and 406 with waveform 402. The processing device determines from the scanned waveforms 404 and 406 that sensor elements 1 and 3 were selected while a snooping device interprets the waveforms to show that sensor elements 2 and 4 were selected.

Figure 5:
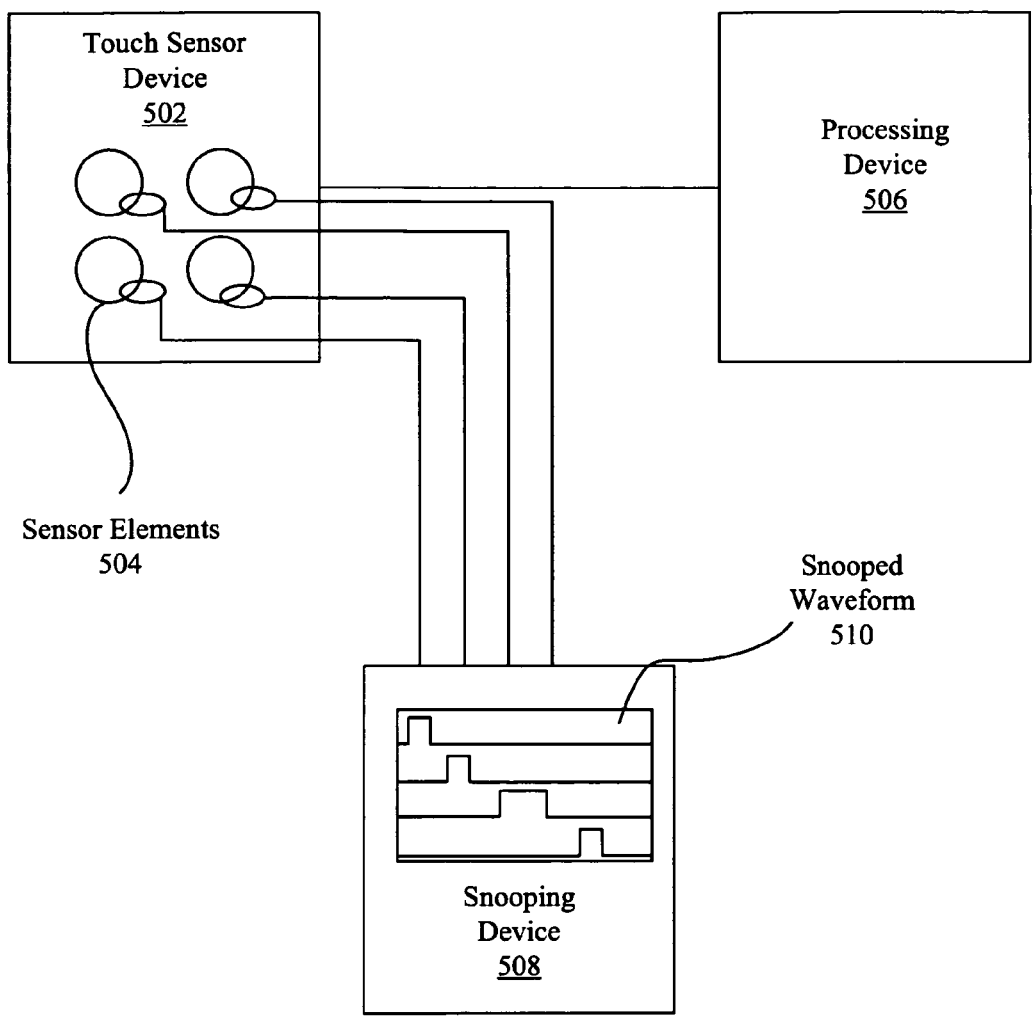
FIG. 5 illustrates a snooping device picking up a scanning sequence at each sensor element.

FIG. 5 illustrates another exemplary snooping device 508 that monitors the scanning sequence at each sensor element 504. Individual sensor elements 504 can be monitored, for example, by placing a thin overlay with embedded sensors over the touch sensor device 502 or by soldering fine wire to each sensor element 504. Regardless of the order of the scanning, if the timing changes on an individual sensor element 504, then the snooping device 508 shows which sensor is being pressed in snooped waveform 510.

Referring again to FIG. 2, the capacitance sensor detection module 250 is coupled with an amplifier 260. In an alternate embodiment, the input of the amplifier 260 is coupled directly to the output of selection module 240. The amplifier 260 can be, for example, a unity gain buffer amplifier, an amplifier with minimal gain, voltage or current follower, or any other circuit capable of creating a mirror waveform that is substantially similar in timing and amplitude to an input waveform.

The input waveform produced by connecting one capacitive sensing element 220 via selection module 240 is duplicated by amplifier 260 and applied to another capacitive sensing element by selection module 290. UI controller 270 controls which capacitive sensing element is selected via selection module 240 for input and which capacitive sensing element is selected via selection module 290 for a mirror waveform. Therefore, processing device 230 can determine the actual input at touch screen 210. In contrast, a snooping device connected to the sensing elements 220, as shown in FIG. 5, reads mirror image waveforms on multiple sensing elements 220. In another embodiment, an input waveform that results from a touch on touch screen 210 has known values over time and UI controller 270 generates a fake waveform via firmware or software and provides the fake waveform to selection module 290.

Figure 6:
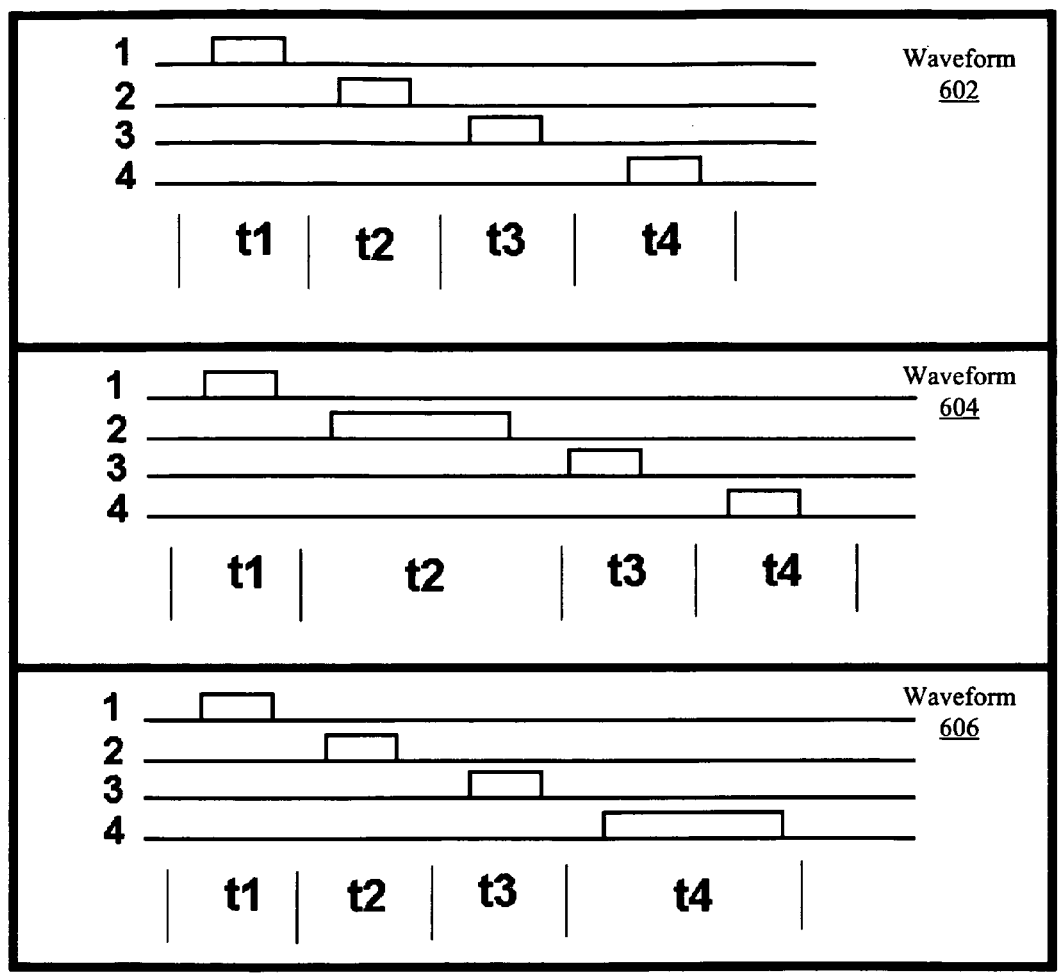
FIG. 6 illustrates an example timing of capacitive sensor waveforms monitored on the snooping device of FIG. 5.

FIG. 6 illustrates example timing of capacitive sensor waveforms monitored on snooping device 508 scanning at each sensor element 504. In FIG. 6, waveform 602 represents a scan with no conductive object near a sensor element resulting in t1 through t4 to be about the same length. Waveform 604 represents a scan with a conductive object near sensor element 2. Accordingly, the conductive object alters waveform 604 and t2 is much longer than previously observed. Waveform 606 represents a scan with a conductive object near sensor element 4. Accordingly, the conductive object alters waveform 606 and t4 is much longer than before. By observing the changes in the individual sections of the sequence timing, the sensor being pressed can be deduced because the change in the waveform of any sensor is due only to the presence of a conductive object.

Figure 7:
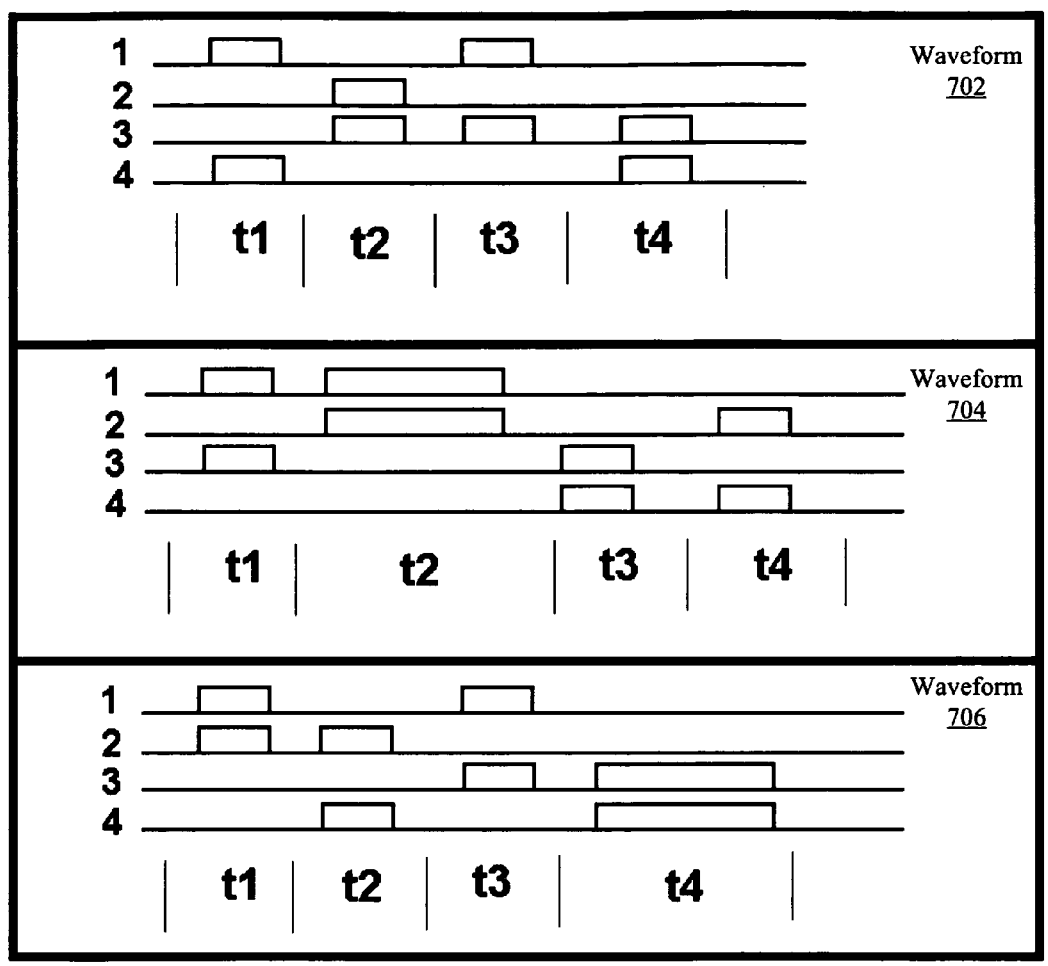
FIG. 7 illustrates an example timing of capacitive sensor waveforms monitored on the snooping device of FIG. 5 and incorporating a circuit for mirroring a capacitive sensor waveform from one sensor element to another sensor element according to one embodiment of the present invention.

FIG. 7 illustrates an example timing of capacitive sensor waveforms monitored on snooping device 508 scanning at each sensor element 504, but incorporating the mirroring circuit illustrated in FIG. 2. In FIG. 7, waveform 702 represents a scan of sensing elements with no conductive object near a sensor element resulting in t1 through t4 to be approximately the same length. For each time slot, t1 through t4, two sensor elements indicate a mirror image scanning signal: the sensor element actually being scanned and the mirror image sensor, the signal for which has been duplicated by the amplifier or processing device as described above. Waveform 704 represents a scan with a conductive object near sensor element 2 and a mirror signal generated on sensor element 1. Accordingly, both signals for 1 and 2 during t2 are much longer than previously observed in waveform 702. Waveform 706 represents a scan with a conductive object near sensor element 4 and a mirror signal generated on sensor element 3. Accordingly, both signals for 4 and 3 during t4 are much longer than previously observed. With such a technique, there is no longer a readily apparent correlation between a finger press and an individual change in scan timing. Nevertheless, the processor device knows which sensor is currently being scanned and which sensor signal just mirrors the timing of the real sensor scan.

In one embodiment, the timing characteristics of the scanning sequence that are modulated by the presence of a conductive object on or near a sensor element 220 may also be simulated by the anti-snooping sequence through features in the firmware of the terminal whenever a conductive object is not present. In the following example, touch-sensitive keys scanned according to a random sequence with additional fake indicator added to sequence. (The symbol "+" denotes timing or amplitude change due to the presence of a conductive object on a sensor element).

no finger sequence=__,3,0,2,1,__,2,1,3,0,__,0,3,1,2
finger sequence=__,3,0+,2,1,__,2+,1,3,0,__,0,3,1+,2 (fake indicator of 0+)
snooped sequence=__0,1+,2,3,__,0+,1,2,3,__,0,1,2+,3
actual key press=<blank>,2,1
result of snooping=1,0,2 (SEQUENCE NOT DETECTED)

The sequences above demonstrate a random sequence of key scans with the addition of inserting a "fake" touch on a touch-sensitive key in the beginning of the sequence. A snooping device, as illustrated in FIG. 1, shows a sequence of scanned keys that includes the fake touch in place of a <blank> or lack of touch in the scan sequence. The snooped waveform, based upon the assumption that the keys are scanned in order provides a determination of an input of 1, 0, and 2 when the actual input was 2 and 1. A snooping device, as illustrated in FIG. 5, shows a sequence of scanned keys that includes the fake touch in place of a <blank> or lack of touch in the scan sequence. The snooped waveform provides a determination of an input of 0, 2, and 1 when the actual input was 2 and 1.

Embodiments of the present invention, described herein, include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Although the present invention has been described with reference to specific exemplary embodiments, it will be evident that various modifications and changes may be made to these embodiments without departing from the broader spirit and scope of the invention as set forth in the claims. Modules and components of hardware implementations can be omitted, separated, or combined without significantly altering embodiments of the invention. Accordingly, the specification and drawings are to be regarded in an illustrative rather than a restrictive sense.

What is claimed is:

1. A method, comprising:
   scanning a plurality of sensor elements disposed in a touch-sensor device to produce a plurality of waveforms, wherein the scanning of the plurality of sensor elements is performed in a random sequence order, and the scanning detects a timing of the random sequence order, each being associated with a corresponding scanned sensor element;
   detecting a change in the timing of a first waveform corresponding to a first sensor element;
   mirroring the change in the timing from the first waveform to a second waveform corresponding to a second sensor element of the plurality of sensor elements; and
   determining a location of a touch on the touch-sensor device based on the mirroring.

2. The method of claim 1, wherein the plurality of sensor elements comprise capacitive sensors.

3. The method of claim 2, wherein the plurality of sensor elements comprises a capacitive sensory array.

4. The method of claim 3, wherein determining a location of a touch on the touch-sensor device comprises:
   detecting a presence of a conductive object on a capacitive sensor; and
   producing a signal representative of the position of the conductive object in relation to the capacitive sensory array.

5. The method of claim 2, wherein a sensor element comprises a capacitive sensor button.

6. The method of claim 1, wherein determining a location of a touch on the touch-sensor device comprises detecting a change in an electrical signal associated with one of the plurality of sensor elements.

7. The method of claim 6, wherein the change in an electrical signal comprises a change in timing of a signal generated as a part of the scanning of the plurality of sensor elements.

8. The method of claim 1, further comprising:
   reading information from a card; and
   authenticating use of the card based upon a sequence of touches on the touch-sensor device.

9. An apparatus, comprising:
   a touch-sensor device having a plurality of sensor elements; and
   a processing device configured to scan the plurality of sensor elements in a random sequence order to generate a plurality of waveforms corresponding to the scan of the plurality of sensor elements and determine a location of a touch on the touch-sensor device, the processing device including an amplifier configured to mirror one or more of the waveforms of the plurality of waveforms, wherein:
   a timing of the random sequence order includes a plurality of time units, each being associated with a corresponding scanned sensor element, a change in the timing includes a first time unit of the plurality of time units being longer than a second time unit of the plurality of time units; and the amplifier is configured to mirror the change in the timing from a first waveform corresponding to a first sensor element of the plurality of sensor elements to a second waveform corresponding to a second sensor element of the plurality of sensor elements.

10. The apparatus of claim 9, wherein the plurality of sensor elements comprise capacitive sensors.

11. The apparatus of claim 10, wherein the plurality of sensor elements comprises a capacitive sensory array.

12. The apparatus of claim 11, wherein the processing device determines a location of a touch on the touch-sensor device by detecting a presence of a conductive object on a capacitive sensor and determining the location of the capacitive sensor in relation to the capacitive sensor array.

13. The apparatus of claim 10, wherein a sensor element comprises a capacitive sensor button.

14. The apparatus of claim 9, wherein the controller determines a location of a touch on the touch-sensor device by detecting a change in an electrical signal associated with one of the plurality of sensor elements.

15. The apparatus of claim 9, wherein the apparatus is an automated teller machine (ATM).

16. The apparatus of claim 9, wherein the apparatus is a point of sale (POS) terminal.

17. The apparatus of claim 9, further comprising:
a card reader coupled to the processing device to obtain account information from a card, wherein access to the account is authenticated by a sequence of touches on the touch-sensor device.

18. An apparatus, comprising:
means for scanning a plurality of sensor elements disposed in a touch-sensor device to generate a plurality of waveforms corresponding to the scanning of the plurality of sensor elements, wherein the scanning of the plurality of sensor elements is performed in a random sequence order, wherein the scanning detects a timing of the random sequence order including a plurality of time units, each being associated with a corresponding scanned sensor element, and a change in the timing includes a first time unit of the plurality of time units being longer than a second time unit of the plurality of time units;
means for mirroring the change in the timing from a first waveform of the plurality of waveforms corresponding to a first sensor element of the plurality of sensor elements to a second waveform of the plurality of waveforms corresponding to a second sensor element of the plurality of sensor elements; and
means for determining a location of a touch on the touch-sensor device based on the scanning.

19. The apparatus of claim 18, further comprising:
means for reading information from a card; and
means for authenticating use of the card based upon a sequence of touches on the touch-sensor device.

20. The apparatus of claim 18, wherein the plurality of sensor elements comprise capacitive sensors.

* * * * *